(12) United States Patent
Sakurai et al.

(10) Patent No.: US 8,269,724 B2
(45) Date of Patent: Sep. 18, 2012

(54) CAPACITIVE DETECTING APPARATUS AND DISPLAY UNIT WITH A PATTERNED CONDUCTIVE LAYER

(75) Inventors: Hisao Sakurai, Saitama (JP); Susumu Kaneko, Miyagi (JP)

(73) Assignee: Sony Corporation, Tokyo (JP)

( * ) Notice: Subject to any disclaimer, the term of this patent is extended or adjusted under 35 U.S.C. 154(b) by 797 days.

(21) Appl. No.: 11/385,112

(22) Filed: Mar. 21, 2006

(65) Prior Publication Data

US 2006/0250373 A1    Nov. 9, 2006

(30) Foreign Application Priority Data

Mar. 23, 2005   (JP) .................................. 2005-083583

(51) Int. Cl.
 *G06F 3/041* (2006.01)
(52) U.S. Cl. ........................................................ 345/173
(58) Field of Classification Search .................. 345/173, 345/174; 463/34–42
 See application file for complete search history.

(56) References Cited

U.S. PATENT DOCUMENTS

| 5,510,813 | A | * | 4/1996 | Makinwa et al. | 345/173 |
| 5,869,791 | A | * | 2/1999 | Young | 178/20.01 |
| 6,400,359 | B1 | * | 6/2002 | Katabami | 345/173 |
| 6,445,426 | B1 | * | 9/2002 | Kang et al. | 349/12 |
| 6,882,338 | B2 | * | 4/2005 | Flowers | 345/174 |
| 7,394,458 | B2 | * | 7/2008 | Lyon et al. | 345/173 |
| 2005/0156906 | A1 | * | 7/2005 | Chiu et al. | 345/173 |
| 2005/0270273 | A1 | * | 12/2005 | Marten | 345/173 |

FOREIGN PATENT DOCUMENTS

| JP | 05-324168 | 12/1993 |
| JP | 2000-047808 | 2/2000 |
| JP | 2000-76014 | 3/2000 |
| JP | 2002-108553 | 4/2002 |
| JP | 2002-342033 | 11/2002 |
| JP | 2004-192093 | 7/2004 |

* cited by examiner

*Primary Examiner* — Chanh Nguyen
*Assistant Examiner* — Ram Mistry
(74) *Attorney, Agent, or Firm* — Wolf, Greenfield & Sacks, P.C.

(57) ABSTRACT

A coordinate input apparatus which can reliably specify a coordinate component (a position coordinate) of a selected position without a complicated structure irrespective of use conditions is provided. A coordinate input apparatus includes a capacity detecting portion which detects capacitance, wherein the coordinate input apparatus specifies a coordinate component of a selected position on the basis of a change in capacitance detected by the capacity detecting portion, and the capacity detecting portion includes a first conductive layer, an insulating layer which is formed on the first conductive layer, and a second conductive layer which is formed on the insulating layer in a mesh shape, and has a predetermined potential difference between the second conductive layer and the first conductive layer.

19 Claims, 11 Drawing Sheets

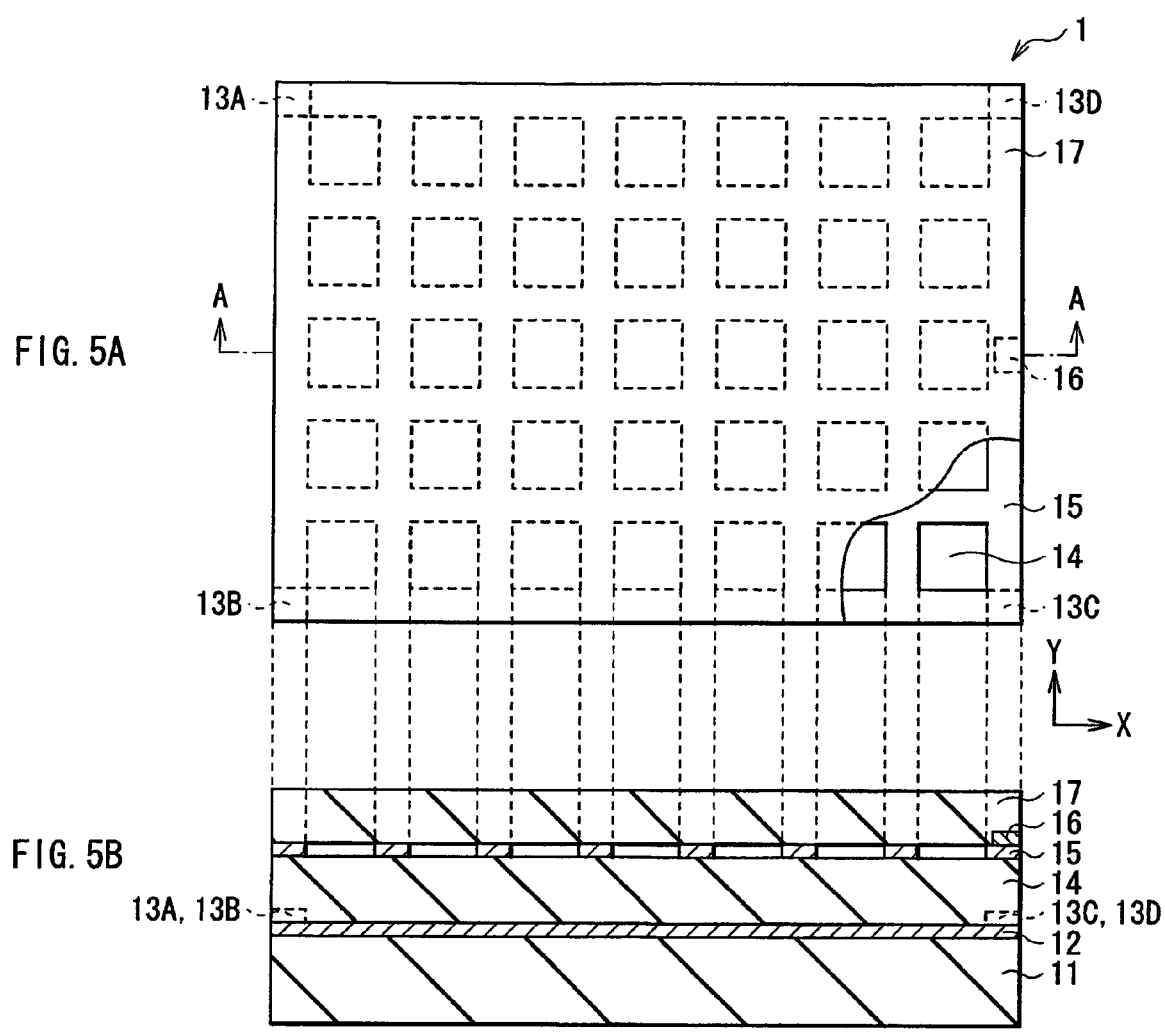

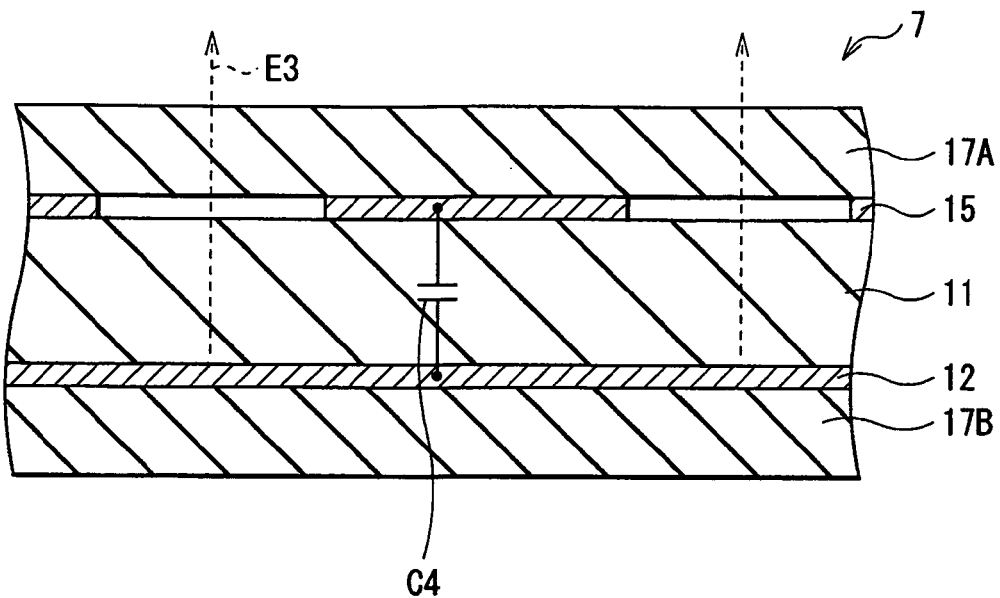
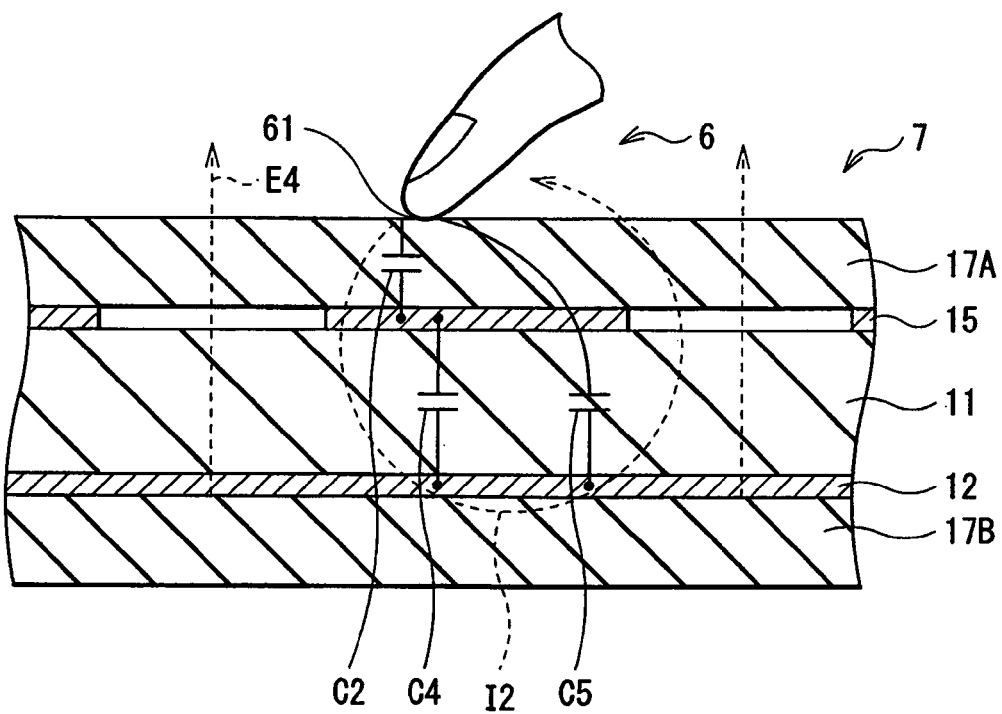

CAPACITIVE DETECTING APPARATUS AND DISPLAY UNIT WITH A PATTERNED CONDUCTIVE LAYER

CROSS REFERENCES TO RELATED APPLICATIONS

The present invention contains subject matter related to Japanese Patent Applications JP 2005-83583 filed in the Japanese Patent Office on Mar. 23, 2005, the entire contents of which being incorporated herein by reference.

BACKGROUND OF THE INVENTION

1. Field of the Invention

The present invention relates to a coordinate input apparatus which specifies a coordinate component (a position coordinate) of a selected position on the basis of a change in capacitance, and a display unit including such a coordinate input apparatus.

2. Description of the Related Art

Techniques of inputting a coordinate component (a position coordinate) of a position selected through the use of the screen of a display unit have been known previously. A typical technique among them is a display unit having a touch panel function. The display unit has a structure in which a touch panel sheet is arranged on a display panel, and a position coordinate of an object which comes into contact with the touch panel sheet (a touch object) is specified and inputted through the use of the touch panel sheet.

There are various types of coordinate input apparatuses using such a touch panel sheet, and a widely used coordinate input apparatus is of a type which detects capacitance. In the coordinate input apparatus, the touch panel sheet detects capacitance, and the position coordinate of the touch object is specified and inputted through the use of a change in capacitance.

For example, in Japanese Unexamined Patent Application Publication No. 2000-76014, as shown in a top view in FIG. 1A and a sectional view taken along a arrow line B-B of FIG. 1A in FIG. 1B, a touch panel sheet 100 with a structure in which a conductive layer 102 and an insulating protective layer 107 are uniformly formed on an insulating substrate 101, and electrodes 103A through 103D are formed at four corners on the conductive layer 102 is disclosed.

Moreover, in Japanese Unexamined Patent Application Publication No. 2002-108553, as shown in a top view in FIG. 2, a touch panel sheet 200 with a structure in which an insulating layer 204 and an insulating protective layer 207 are uniformly formed on an insulating substrate 201, and a strip-shaped conductive layer 202 extending in an x-axis direction and a strip-shaped conductive layer 205 extending in a y-axis direction are formed with the insulating layer 204 in between, and electrodes 203 and 206 are formed on the conductive layers 202 and 205, respectively is disclosed.

SUMMARY OF THE INVENTION

The position coordinate input apparatus disclosed in Japanese Unexamined Patent Application Publication No. 2000-76014 or 2002-108553 includes the touch panel sheet 100 or 200 with the above-described structure and an arithmetic circuit which specifies a position coordinate on the basis of capacitance detected by the touch panel sheet 100 or 200. In the position coordinate input apparatus, an AC current flows through the touch panel 100 or 200 via the electrodes 103A through 103D or the electrodes 203 and 206, and the arithmetic circuit detects a bias of the AC current, and specifies the position coordinate as a change in capacitance.

In order to specify the position coordinate in the position coordinate input apparatus, it is necessary to form a current loop with such an AC current. For example, in Japanese Unexamined Patent Application Publication No. 2000-76014, a current loop along a path which starts and ends at the touch panel 100 via a touch object (for example, a finger) and the arithmetic circuit is formed.

However, in the position coordinate input apparatus using the touch panel sheet 100, there is an issue that the above-described current loop is not formed depending on use conditions, thereby the position coordinate is not specified. More specifically, in the case where an apparatus including the touch panel sheet 100 is, for example, an AC powered device (for example, a personal computer including a display unit to which the touch panel sheet is added) or the like, a large space capacity for an AC line (a power supply system) is formed, so when the touch object is a large object such as a human body, the current loop is formed, thereby the position coordinate can be specified. However, in the case where the apparatus including the touch panel sheet is, for example, a portable device (for example, a camcorder or the like) or the like, unlike the AC powered device, as the portable device is small, a space capacity formed in the portable device is small, so the current loop may not be formed. It can be considered that a current loop is formed through having a contact point between the device and the human body (for example, between the device and a hand holding the device); however, for example, in winter, an insulating material such as a glove may be placed between the device and the human body, so the current loop may not be formed.

In the position coordinate input apparatus using the touch panel sheet 200, in a contact point with the touch panel sheet 200, a current loop is always formed between the touch object and a pair of electrodes 203 and 206, so an issue which arises in the above-described touch panel sheet 100 does not arise. However, in the structure of the touch panel 200, as described above, the strip-shaped conductive layers 202 and 205 are formed, and the electrode 203 and the electrode 206 are disposed on each strip-shaped conductive layer 202 and each strip-shaped conductive layer 205, respectively. Therefore, the structure of the position coordinate input apparatus is complicated, so there is an issue that the complicated structure causes a large reduction in the degree of freedom in the design such as, for example, a restriction on the layout of wiring from the electrodes 203 and 206 to the arithmetic circuit. The issue is a noticeable restriction specifically on designing a transmissive (light-transmission) touch panel.

Thus, in related arts, it is difficult to obtain a coordinate input apparatus capable of reliably specifying a coordinate component (a position coordinate) of a selected position without a complicated structure irrespective of use conditions. Therefore, it is difficult to obtain a display unit including such a coordinate input apparatus.

In view of the foregoing, it is desirable to provide a coordinate input apparatus and a display unit which can reliably specify a coordinate component of a selected position without a complicated structure irrespective of use condition.

According to an embodiment of the present invention, there is provided a coordinate input apparatus including: a capacity detecting portion which detects capacitance, wherein the coordinate input apparatus specifies a coordinate component of a selected position on the basis of a change in capacitance detected by the capacity detecting portion, the capacity detecting portion includes: a first conductive layer, an insulating layer which is formed on the first conductive layer, and a second conductive layer which is formed on the insulating layer in a mesh shape, and has a predetermined potential difference between the second conductive layer and the first conductive layer. In this case, the above-described capacity detecting portion further includes four electrodes which are formed at four corners on the first conductive layer, and the capacity detecting portion can be formed so that the above-described predetermined potential difference is generated by a voltage applied via the four electrodes.

Herein, "a mesh shape" means not only a shape in which lines are periodically arranged literally but also a shape in which a plurality of holes with any shape are arranged in the second conductive layer.

According to an embodiment of the present invention, there is provided a display unit including: a display panel which display an image; a coordinate input means being formed on the display panel, and including a capacity detecting portion detecting capacitance, the coordinate input means for specifying a coordinate component of a selected position on the basis of a change in capacitance detected by the capacity detecting portion, wherein the capacity detecting portion includes: a first conductive layer, an insulating layer which is formed on the first conductive layer, and a second conductive layer which is formed on the insulating layer in a mesh shape, and has a predetermined potential difference between the second conductive layer and the first conductive layer.

In the coordinate input apparatus and the display unit according to the embodiment of the invention, the capacity detecting portion has a laminate structure including the first conductive layer, the insulating layer and the second conductive layer, and the second conductive layer is formed in a mesh shape, so capacitance is formed between the first conductive layer with a predetermined potential difference and the second conductive layer, thereby a current loop is always formed between them. Then, when a change in capacitance is detected, a coordinate component of a selected position can be specified.

In the coordinate input apparatus and the display unit according to the embodiment of the invention, the capacity detecting portion has a laminate structure including the first conductive layer, the insulating layer and the second conductive layer with a mesh shape, and a predetermined potential difference is generated between the first conductive layer and the second conductive layer, so a current loop can be always formed between the first and the second conductive layers, and a coordinate component of a selected position can be reliably specified without a complicated structure irrespective of use conditions.

Other and further objects, features and advantages of the invention will appear more fully from the following description.

BRIEF DESCRIPTION OF THE DRAWINGS

FIGS. 5A and 5B are a top view and a sectional view of an example of the structure of the capacity detecting portion shown in FIG. 3;

FIGS. 8A and 8B are sectional views for describing another example of the process of specifying a position coordinate;

DETAILED DESCRIPTION OF THE PREFERRED EMBODIMENTS

A preferred embodiment will be described in detail below referring to the accompanying drawings.

Figure 1:
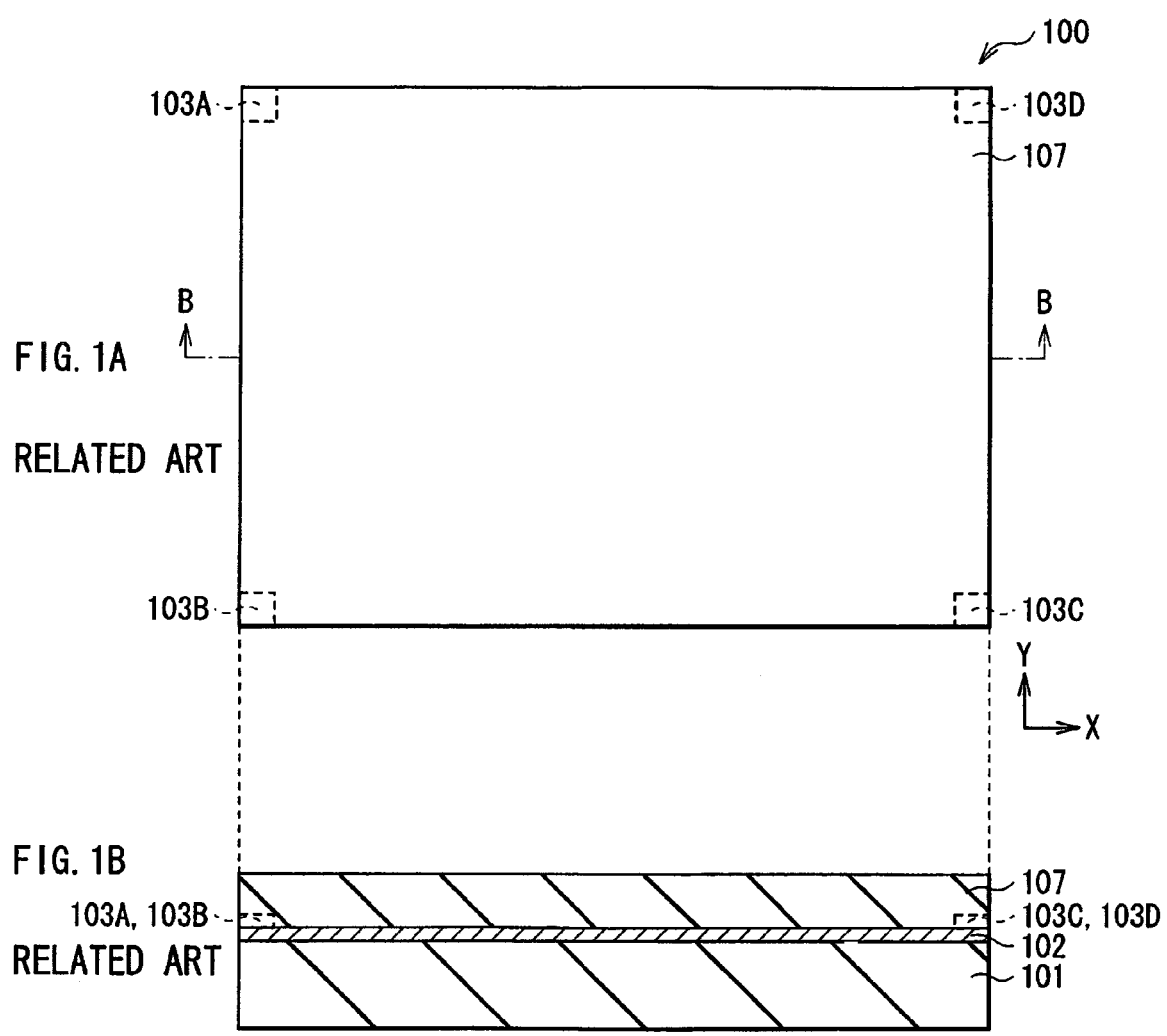
FIGS. 1A and 1B are a top view and a sectional view of an example of the structure of a capacity detecting portion in a coordinate input apparatus in a related art.
Figure 2:
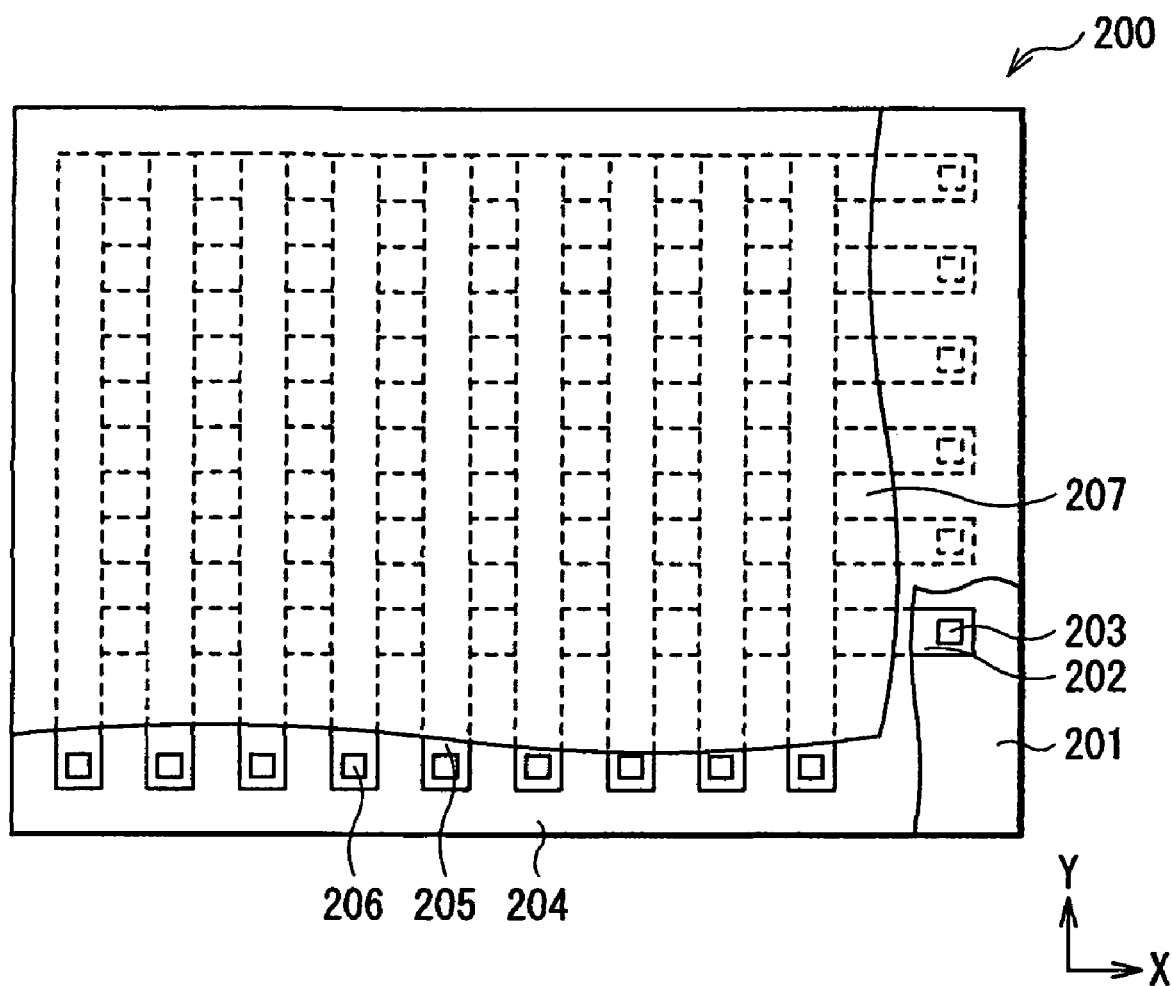
FIG. 2 is a top view of another example of the structure of a capacity detecting portion in a coordinate input apparatus in a related art.
Figure 3:
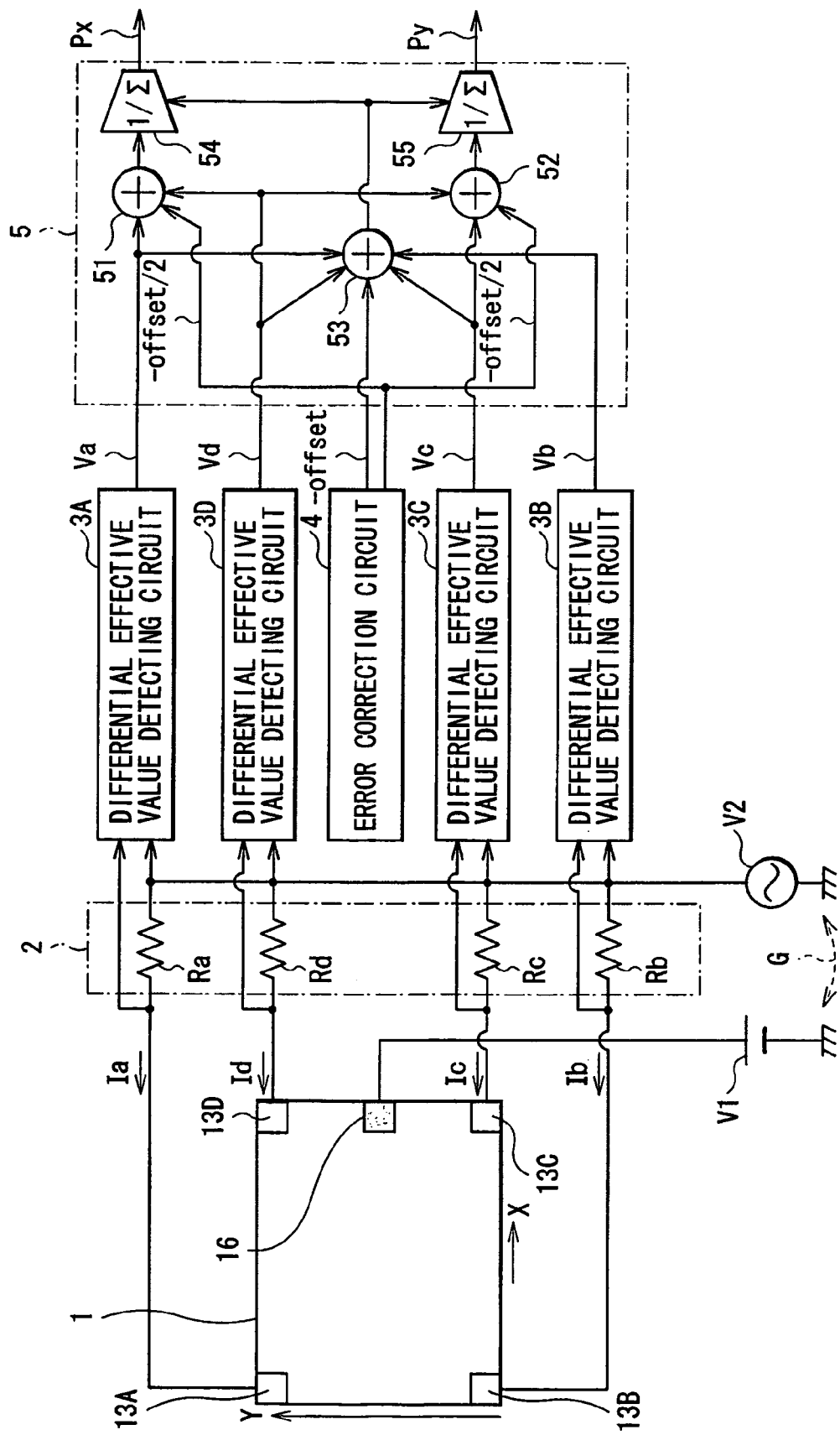
FIG. 3 is a functional block diagram of the whole structure of a coordinate input apparatus according to an embodiment of the invention.

FIG. 3 shows the whole structure of a position coordinate input apparatus according to an embodiment of the invention. The position coordinate input apparatus specifies and inputs a coordinate component (position coordinates in an x-axis direction and a y-axis direction) of a position selected by a touch object (for example, a finger) which comes into contact with a capacity detecting portion 1, and the position coordinate input apparatus includes the capacity detecting portion 1, a current detecting portion 2, differential effective value detecting circuits 3A through 3D, an error correction circuit 4 and a position coordinate arithmetic portion 5.

The capacity detecting portion 1 has a laminate structure including four sensing electrodes 13A through 13D which are disposed at four corners in the capacity detecting portion 1, and a constant potential electrode 16 which is disposed in an end portion of the capacity detecting portion 1. The sensing electrodes 13A through 13D are connected to a reference signal power supply V2 which outputs an AC reference signal via the current detecting portion 2. On the other hand, a constant potential V1 which is a predetermined DC potential is supplied to the constant potential electrode 16. The sensing electrodes 13A through 13D correspond to a specific example of "four electrodes" in the invention.

Figure 4:
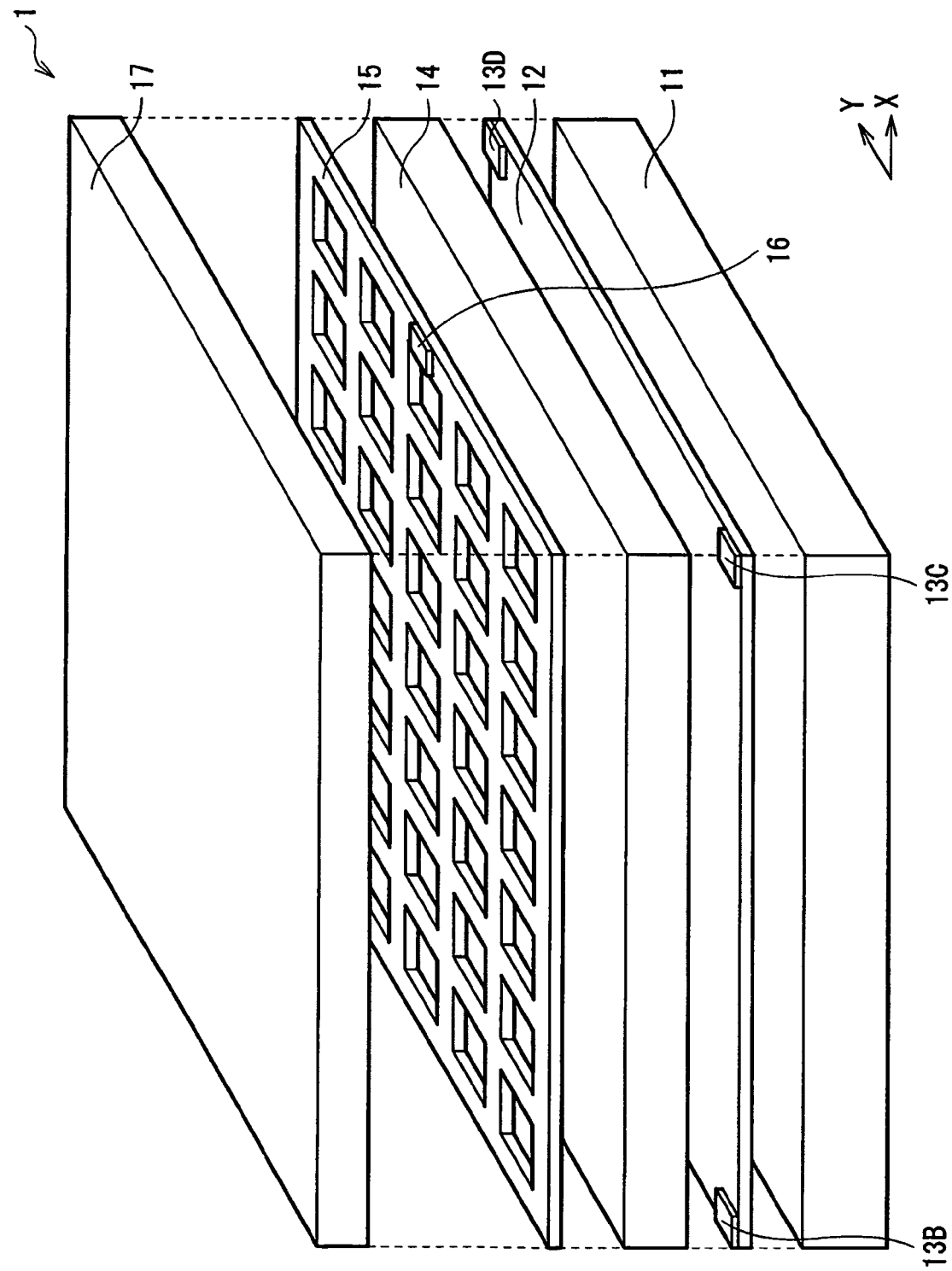
FIG. 4 is a perspective view of an example of the structure of a capacity detecting portion shown in FIG. 3.

Referring to FIGS. 4, 5A and 5B, a specific structure (a laminate structure) of the capacity detecting portion 1 will be described below. FIGS. 4, 5A and 5B show a perspective view, a top view and a sectional view of the structure of the capacity detecting portion 1, respectively.

The capacity detecting portion 1 includes a laminate structure in which a first conductive layer 12, the sensing electrodes 13A through 13D, an insulating layer 14, a second conductive layer 15, the constant potential electrode 16 and a surface protection layer 17 are laminated on a base material 11.

The base material 11 is the substrate of the laminate structure, and is made of, for example, a transparent or semi-transparent glass material or plastic material.

The first conductive layer 12 is uniformly formed on the base material 11, and is made of, for example, a transparent or semi-transparent conductive material such as ITO (Indium Tin Oxide). Moreover, the sensing electrodes 13A through 13D are disposed at four corners on the first conductive layer 12 as described above, and an AC reference signal from the reference signal power supply V2 is inputted into the sensing electrodes 13A through 13D. The sensing electrodes 13A through 13D are made of, for example, a metal material such as silver (Ag), gold (Au), nickel (Ni) or copper (Cu).

The insulating layer 14 is formed on the first conductive layer 12 and the sensing electrodes 13A through 13D, and is made of, for example, a transparent or semi-transparent insulating material such as silicon oxide ($SiO_2$).

The second conductive layer 15 is formed on the insulating layer 14, and is made of, for example, a transparent or semi-transparent conductive material such as ITO as in the case of the first conductive layer 12. As shown in FIGS. 4 and 5A, the second conductive layer 15 is formed in a mesh shape. As will be described in detail later, the second conductive layer 15 has such a structure so that an electric field (electric lines of force) generated between the first conductive layer 12 and the second conductive layer 15 can pass through holes in the mesh shaped second conductive layer 15, that is, the electric field is not shielded. The shape of the second conductive layer 15 is not limited to a uniform mesh shape shown in FIGS. 4 and 5A, and a plurality of holes with any shape may be formed in the second conductive layer 15. However, the second conductive layer 15 is preferably formed in a uniform mesh shape, because the magnitude of the above-described electric field (the number of electric lines of force) is isotropically distributed in the capacity detecting portion 1, so the position coordinates can be detected with uniform sensitivity.

As described above, the constant potential electrode 16 is disposed in an end portion of the second conductive layer 15 (in an example of FIG. 4, in a region between the sensing electrodes 13C and 13D in an edge portion of the second conductive layer 15), and a constant potential V1 is supplied to the constant potential electrode 16. Consequently, the constant potential V1 is supplied to the second conductive layer 15 via the constant potential electrode 16, thereby the second conductive layer 15 has a predetermined constant potential V1. Therefore, a predetermined potential difference (a potential difference between the AC reference signal and the constant potential V1) is generated between the first conductive layer 12 and the second conductive layer 15, so AC currents (sensing currents) Ia through Id (refer to FIG. 3) flow through the first conductive layer 12 via the sensing electrodes 13A through 13D. The constant potential electrode 16 is made of, for example, a metal material such as silver (Ag), gold (Au), nickel (Ni) or copper (Cu). The arrangement of the constant potential electrode 16 is not limited to the arrangement shown in FIG. 4 or the like, and as long as the constant potential V1 can be applied to the second conductive layer 15, any other arrangement of the constant potential electrode 16 may be used.

The surface protection layer 17 protects the surface of the laminate structure (including the first conductive layer 12, the sensing electrodes 13A through 13D, the insulating layer 14, the second conductive layer 15 and the constant potential electrode 16) on the base material 11, and is made of, for example, a transparent or semi-transparent insulating material such as silicon oxide ($SiO_2$) or silicon nitride ($SiN_x$).

The capacity detecting portion 1 with such a structure detects capacitance generated in the laminate structure via the sensing electrodes 13A through 13D. The details will be described later.

Referring back to FIG. 3, the current detecting portion 2 includes four resistors Ra through Rd. One end of the resistor Ra, one end of the resistor Rb, one end of the resistor Rc and one end of the resistor Rd are connected to the sensing electrodes 13A, 13B, 13C and 13D and first input terminals of differential effective value detecting circuits 3A, 3B, 3C and 3D, respectively. Moreover, the other ends of the resistors Ra through Rd are connected to second input terminals of differential effective value detecting circuits 3A through 3D, respectively, and the reference signal power supply V2. As the current detecting portion 2 has such a structure, the current detecting portion 2 generates voltages at both ends of the resistors Ra through Rd according to the magnitudes of the sensing currents Ia through Id which flow from the reference signal power supply V2 to the sensing electrodes 13A through 13D of the capacity detecting portion 1, and outputs the voltages to the first and the second input terminals of the differential effective value detecting circuits 3A through 3D. In other words, the current detecting portion 2 functions as a circuit which converts between current and voltage.

The differential effective value detecting circuits 3A through 3D are circuits determining differential effective values (effective value voltages Va through Vd) between the first and the second input terminals on the basis of a reference signal outputted from the reference signal power supply V2 to the second input terminals, and voltage values (potentials at one ends of the resistors Ra through Rd) corresponding to the magnitudes of the sensing currents Ia through Id which flow from the current detecting portion 2 to the first input terminals. More specifically, when a difference between the reference signal and the voltage values corresponding to the magnitudes of the sensing currents Ia through Id is large, a change in the sensing currents Ia through Id is large, so the effective value voltages Va through Vd become large. The effective value voltages Va through Vd are outputted to the position coordinate arithmetic portion 5.

The error correction circuit 4 is a circuit for correcting an error when specifying the position coordinates of the touch object in the position coordinate arithmetic portion 5 as will be described below. More specifically, position coordinates determined when the touch object is not in contact with the capacity detecting portion 1 are considered as offset voltages ((−offset) and (−offset/2)), and the offset voltages are stored in a storage section (such as a semiconductor memory, not shown) disposed in the error correction circuit 5. The offset voltages stored in the error correction circuit 4 are outputted to the position coordinate arithmetic portion 5, and as will be described below, the offset voltages are used for arithmetic operations in the case where the touch object comes into contact with the capacity detecting portion 1.

The position coordinate arithmetic portion 5 includes adder circuits 51 through 53 and divider circuits 54 and 55. The adder circuit 51 is a circuit which adds the effective value voltages Va and Vd and the offset voltage (−offset/2) together, and then outputs the addition result to the divider circuit 54. The adder circuit 52 is a circuit which adds the effective value voltages Vc and Vd and the offset voltage (−offset/2) together, and then outputs the addition result to the divider circuit 55. The adder circuit 53 is a circuit which adds the effective value voltages Va through Vd and the offset voltage (−offset) together, and then outputs the addition result to the divider circuits 54 and 55. The divider circuit 54 is a circuit which divides the addition result from the adder circuit 51 by the addition result from the adder circuit 53, and then outputs the division result. The divider circuit 55 is a circuit which divides the addition result from the adder circuit 52 by the addition result from the adder circuit 53, and then outputs the division result. As the position coordinate arithmetic portion 5 has such a structure, the position coordinate arithmetic portion 5 performs arithmetic operations for specifying the position coordinates (the position coordinates Px and Py in an x-axis direction and a y-axis direction) of the touch object on the basis of the effective value voltages Va through Vd supplied from the differential effective value detecting circuits 3A through 3D and the offset voltages ((−offset) and (−offset/2)) supplied from the error correction circuit 4, and then outputs the arithmetic result, that is, the position coordinates Px and Py.

More specifically, while the above-described division result by the divider circuit 54 is the position coordinate Px in an x-axis direction, the division result by the divider circuit 55 is the position coordinate Py in a y-axis direction. The arithmetic operations for specifying the position coordinates Px and Py is summarized by the following formulas (1) and (2).

$$Px = (Va + Vd - \text{offset}x/2)/(Va + Vb + Vc + Vd - \text{offset}x) \quad (1)$$

$$Py = (Vc + Vd - \text{offset}y/2)/(Va + Vb + Vc + Vd - \text{offset}y) \quad (2)$$

In the formulas (1) and (2), offsetx and offsety are an offset voltage in an x-axis direction and an offset voltage in a y-axis direction, respectively.

Next, an example of a method of manufacturing the capacity detecting portion 1 with the above-described structure will be described below.

At first, the first conductive layer 12 made of the above-described material is formed on the base material 11 made of the above-described material by, for example, sputtering.

Next, the sensing electrodes 13A through 13D made of the above-described material are formed at four corners on the first conductive layer 12 by, for example, printing.

Then, the insulating layer 14 made of the above-described material is formed on the first conductive layer 12 and the sensing electrodes 13A through 13D by, for example, coating.

Next, a film made of the material of the second conductive layer 15 is formed on the insulating layer 14 by, for example, sputtering, and then the film is formed in a predetermined shape by, for example, etching or the like so as to form the second conductive layer 15.

Then, the constant potential electrode 16 made of the above-described material is formed on the end portion of the second conductive layer 15 by, for example, printing.

Finally, the surface protection layer 17 made of the above-described material is formed on the second conductive layer 15 and the constant potential electrode 16 by, for example, coating. Thus, the capacity detecting portion 1 shown in FIGS. 4, 5A and 5B is manufactured.

Figure 6A:
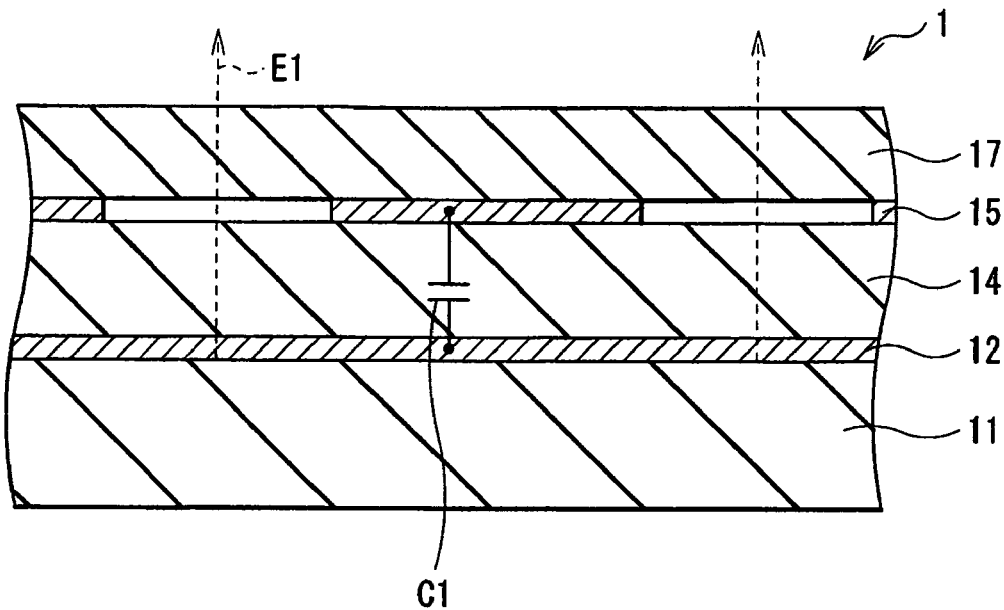
FIGS. 6A and 6B are sectional views for describing an example of a process of specifying a position coordinate.
Figure 6B:
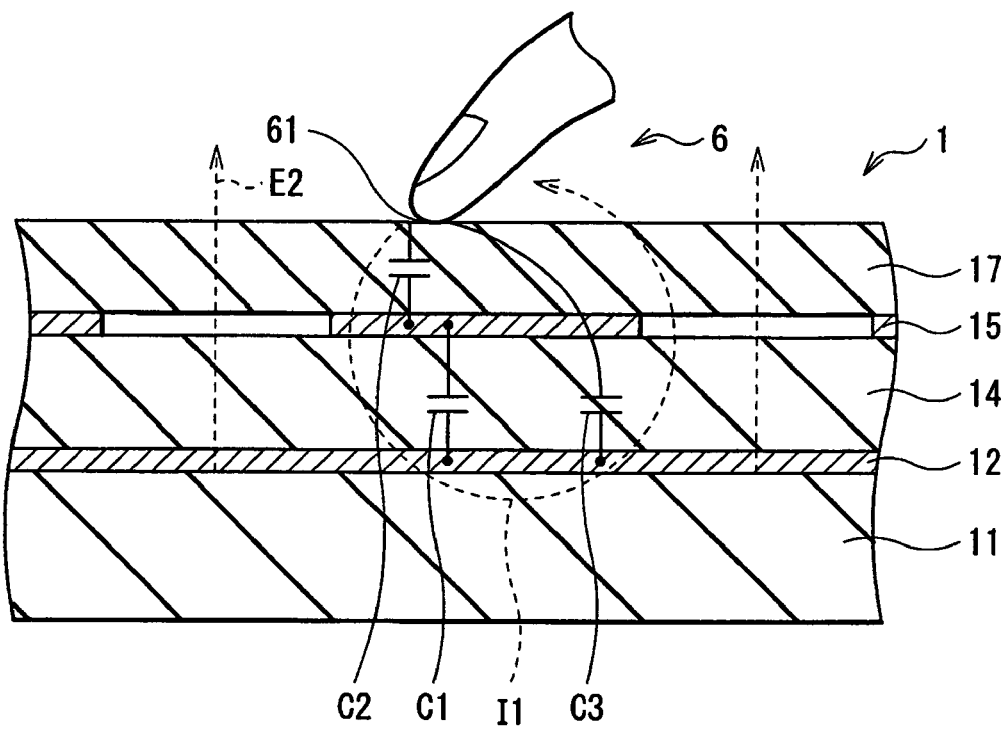

Next, referring to FIGS. 3 through 6A and 6B, a process of specifying the position coordinates of the touch object in the coordinate input apparatus with such a structure will be described below. FIGS. 6A and 6B show sectional views showing states when the position coordinates of the touch object are specified, and FIG. 6A shows a state when the touch object is not in contact with the capacity detecting portion 1, and FIG. 6B shows a state when the touch object comes in contact with the capacity detecting portion 1.

At first, as shown in FIG. 6A, when the touch object is not in contact with the capacity detecting portion 1, an electric field E1 is generated between the first conductive layer 12 which is uniformly formed and the second conductive layer 15 with a mesh shape, thereby a capacitance C1 is formed between them. In other words, as described above, as the second conductive layer 15 has a mesh shape, the capacitance is formed in a state in which the generated electric field is not shielded. Therefore, a predetermined potential difference is generated between the first conductive layer 12 to which the AC reference signal is inputted via the sensing electrodes 13A through 13D and the second conductive layer 15 having the constant potential V1, so the AC sensing currents Ia through Id flow through the sensing electrodes 13A through 13D, respectively. In other words, a current loop is always formed between them irrespective of use conditions of the position coordinate input apparatus. In addition, in the case where the touch object is not in contact with the capacity detecting portion 1, the electric field E1 is partially concentrated; however, the electric field E1 is approximately uniform throughout the capacity detecting portion 1, so the magnitudes of the sensing currents Ia through Id can be considered the same, and there is no bias of the magnitudes of the sensing currents Ia through Id.

The sensing currents Ia through Id which flow in such a manner are converted into voltages by the current detecting portion 2, and the voltages converted according to the magnitudes of the sensing currents Ia through Id are inputted into the first input terminals of the differential effective value detecting circuits 3A through 3D. In the differential effective value detecting circuits 3A through 3D, the effective value voltages Va through Vd are determined on the basis of voltages corresponding to the magnitudes of the sensing currents Ia through Id and the reference signal inputted from the reference signal power supply V2 to the second input terminals. Then, the position coordinate detecting portion performs arithmetic operations of the following formulas (3) and (4) on the basis of the effective value voltages Va through Vd so as to determine the offset voltages offsetx and offsety in an x-axis direction and a y-axis direction. Thus, the position coordinates (the offset voltages) when the touch object is not in contact with the capacity detecting portion 1 are determined, and the position coordinates are stored in the storage section (not shown) in the error correction circuit 4. In the case where the touch object is not in contact with the capacity detecting portion 1 as described above, the magnitudes of the sensing currents Ia through Id can be considered the same, so the position coordinates determined by the formulas (3) and (4) are ½ (that is, the center of the capacity detecting portion 1).

$$\text{offset}x = (Va + Vd)/(Va + Vb + Vc + Vd) \quad (3)$$

$$\text{offset}y = (Vc + Vd)/(Va + Vb + Vc + Vd) \quad (4)$$

On the other hand, in the case where the touch object 6 comes into contact with the capacity detecting portion 1, as shown in FIG. 6B, an electric field E2 (which is different from the electric field E1) is generated between the first conductive layer 12 and the second conductive layer 15, and in addition to the capacitance C1 between them, a capacitance C2 is formed between the second conductive layer 15 and a contact surface 61, and a capacitance C3 is formed between the first conductive layer 12 and the contact surface 61. In other words, when the touch object 6 is not in contact with the capacity detecting portion 1, the capacitance is "C1"; however, when the touch object 6 comes into contact with the capacity detecting portion 1, the capacitance is "C1+(C2×C3)/(C2+C3)" as shown in FIG. 6B, so the value of the capacitance changes. Moreover, also in this case, a current loop I1 is always formed between the contact surface 61 and the first and the second conductive layers 12 and 15 irrespective of use conditions of the position coordinate input apparatus.

Further, the magnitudes of the sensing currents Ia through Id at this time increase in proportion to an increase in capacity "(C2×C3/(C2+C3)", and biases of the sensing currents Ia through Id change according to the position coordinates of the contact surface 61. Therefore, the sensing currents Ia through Id in which a bias is generated in such a manner are converted into voltages by the current detecting portion 2, and the effective voltage values Va through Vd are determined by the differential effective value detecting circuits 3A through 3D on the basis of the voltages, and the arithmetic operations of the above-described formulas (1) and (2) are performed by the position coordinate arithmetic portion 5 and the error correction circuit 4. Thereby, the position coordinates Px and Py when the touch object 6 comes into contact with the capacity detecting portion 1 are specified. Thus, a process of specifying the position coordinates Px and Py of the touch object 6 is completed.

As described above, in the embodiment, the capacity detecting portion 1 has a laminate structure including the first conductive layer 12, the insulating layer 14 and the second conductive layer 15 with a mesh shape, and a predetermined potential difference between the first conductive layer 12 and the second conductive layer 15 (a potential difference between the AC reference signal and the constant potential V1) is generated, so a current loop can be always formed between the first and the second conductive layers 12 and 15, and the position coordinates Px and Py of the touch object 6 can be reliably specified irrespective of use conditions.

Moreover, the second conductive layer 15 is formed in a mesh shape without a complicated layer structure or a complicated electrode structure, and the sensing electrodes 13A through 13D and the constant potential electrode 16 are only formed at four corners of the first conductive layer 12 and an end portion of the second conductive layer 15, so compared to related arts, the position coordinates Px and Py of the touch object 6 can be inputted without a complicated structure.

Further, the position coordinates when the touch object 6 is not in contact with the capacity detecting portion 1 are determined as offset voltages (offsetx and offsety), and when the touch object 6 comes into contact with the capacity detecting portion 1, an error is corrected through the use of the offset voltages, so the position coordinates Px and Py of the touch object 6 can be specified with high position accuracy.

Although the invention is described referring to the embodiment, the invention is not limited to the embodiment, and can be variously modified.

Figure 7:
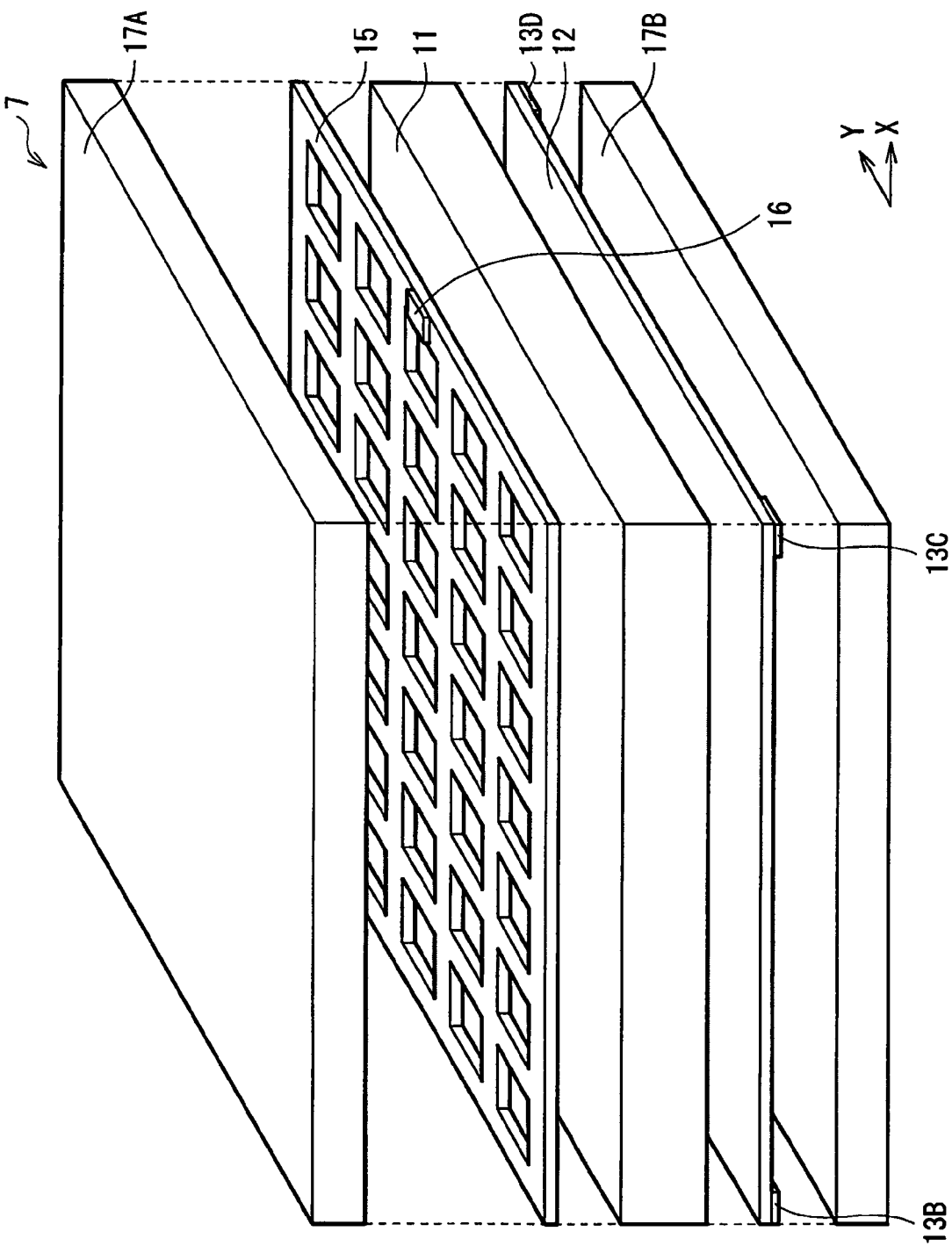
FIG. 7 is a perspective view of another example of the structure of the capacity detecting portion.

For example, in the above-described embodiment, the case where a conductive layer, an insulating layer or the like is formed on the surface of the base material 11 as a substrate in the capacity detecting portion 1 is described as an example; however, for example, as shown in a capacity detecting portion 7 shown in FIG. 7, the base material 11 may also serve as the insulating layer 14. More specifically, as in the case of the capacity detecting portion 1, the second conductive layer 15 and a surface protection layer 17A are formed on a front surface of the base material 11 as the insulating layer 14, and in addition to the first conductive layer 12 and the sensing electrodes 13A through 13D, a surface protection layer 17B for the back surface is formed on a back surface of the base material 11. In the case where the capacity detecting portion 7 has such a structure, as shown in sectional views of FIGS. 8A and 8B, as in the case of the embodiment, when the touch object 6 comes into contact with the capacity detecting portion 7, the capacitance which is "C4" when the touch object 6 is not in contact with the capacity detecting portion 7 becomes "C4+(C2×C5)/(C2+C5)", so the value of the capacitance changes (also the electric field changes from an electric field E3 to an electric field E4). Moreover, also in this case, irrespective of the use conditions of the position coordinate input apparatus, a current loop 12 is always formed between the contact surface 61 and the first and the second conductive layers 12 and 15. Therefore, the same effects as those in the above-described embodiment can be obtained. Further, in the case where the capacity detecting portion 7 is formed in such a manner, a laminate structure is formed on both sides of the base material 11, so compared to the case where the laminate structure is formed only on the front surface of the base material 11, a manufacturing process can be simplified, and manufacturing costs can be reduced.

Figure 9:
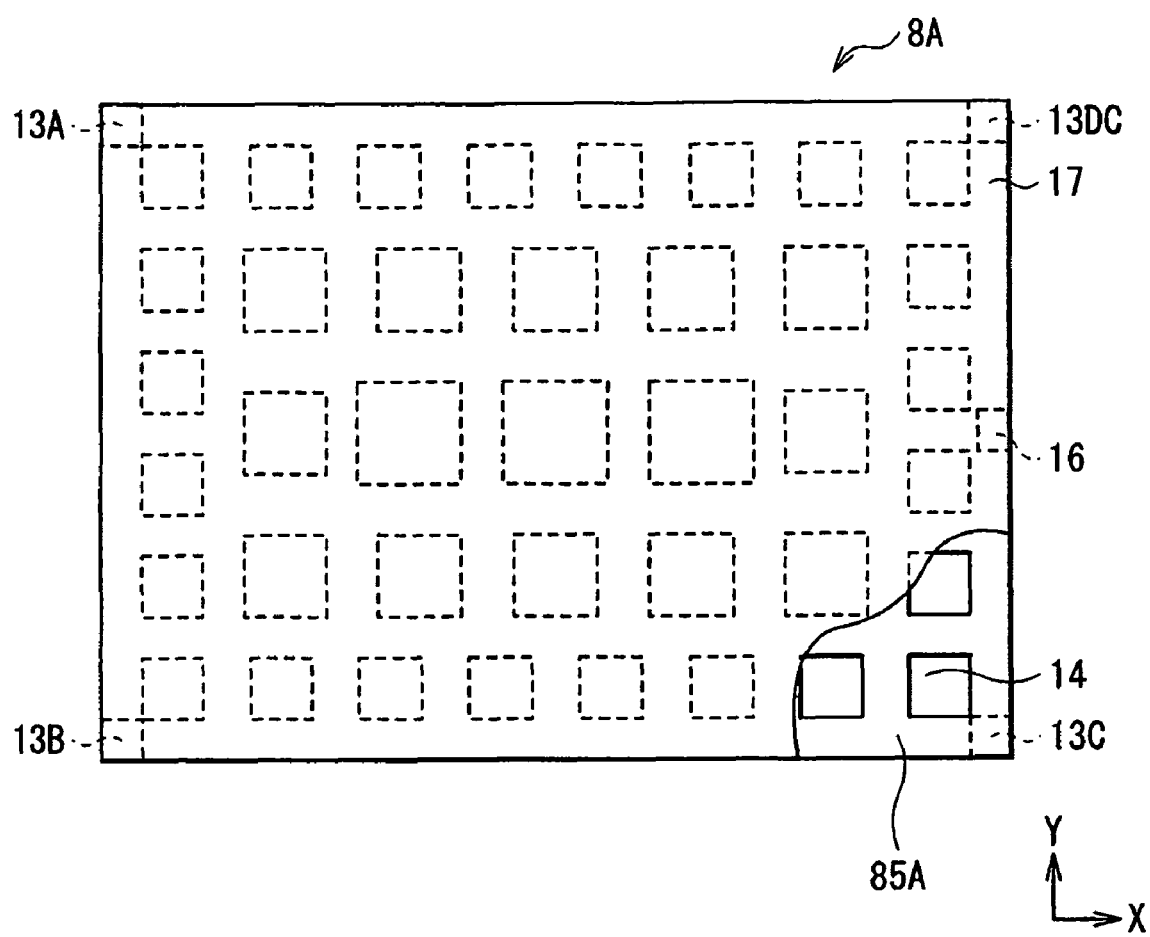
FIG. 9 is a top view of another example of the structure of the capacity detecting portion.

Moreover, in the above-described embodiment, the case where the second conductive layer 15 is formed in a uniform mesh shape is described as an example; however, for example, as shown in a top view of a capacity detecting portion 8A in FIG. 9, the sizes of holes in a mesh shape of a second conductive layer 85A may gradually increase from an end portion (more specifically, in FIG. 9, the positions of the sensing electrodes 13A through 13D) to a central portion in the second conductive layer 85A. In the case where the capacity detecting portion 8A has such a structure, the magnitudes of electric fields passing through the holes from the end portion to the central portion in the second conductive layer 85A gradually increase (the number of electric lines of force gradually increase), so the second conductive layer 85A functions to cancel out an increase in the impedance of the second conductive layer 85A from the end portion to the central portion, and the sensitivity of detecting the position coordinates Px and Py is improved in the central portion. Therefore, in addition to the effects in the above-described embodiment, irrespective of the positions of the position coordinates Px and Py in the capacity detecting portion 8A, the position coordinates Px and Py can be detected with uniform sensitivity.

Figure 10:
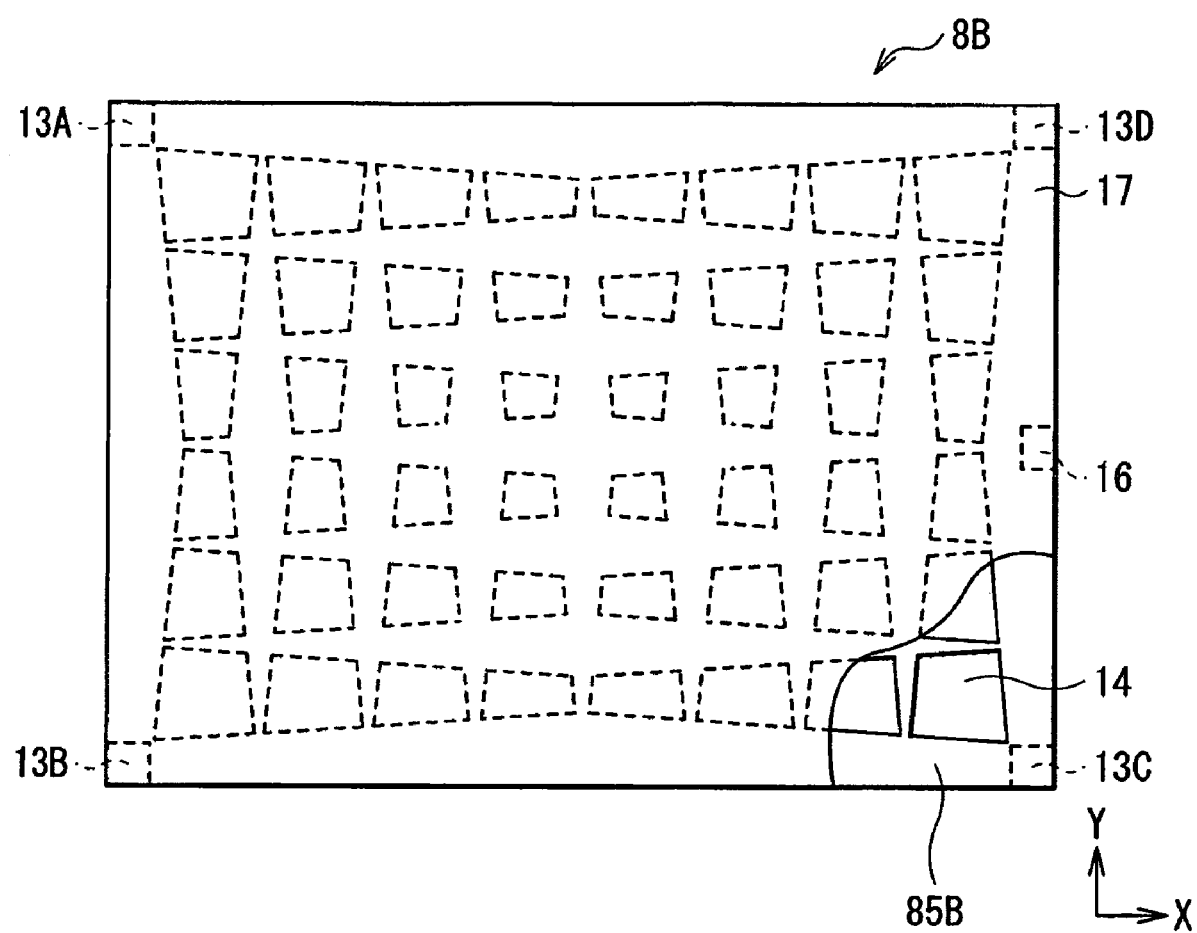
FIG. 10 is a top view of another example of the structure of the capacity detecting portion.

Moreover, in a capacity detecting portion 8B shown in a top view of FIG. 10, the widths of lines in a second conductive layer 85B may gradually increase from an end portion (more specifically, also in FIG. 10, the positions of the sensing electrodes 13A through 13D) to a central portion in the second conductive layer 85B. In the case where the capacity detecting portion 8B has such a structure, the impedance of the second conductive layer 85B is reduced from the end portion to the central portion in the second conductive layer 85B, so as in the case of FIG. 9, the sensitivity of detecting the position coordinates Px and Py is improved in the central portion. Therefore, also in this case, in addition to the effects in the above-described embodiment, an effect by impedance can be considered, so irrespective of the positions of the position coordinates Px and Py in the capacity detecting portion 8B, the position coordinates Px and Py can be detected with more uniform sensitivity.

In the above-described embodiment, the case where four sensing electrodes 13A through 13D are arranged at four corners on the first conductive layer 12 is described as an example; however, the arrangement and the number of the sensing electrodes are not limited to the case, and the sensing electrodes may be arranged so that the reference signal is inputted from the end portion of the first conductive layer 12. As in the case of the above-described embodiment, four sensing electrodes are preferably arranged at four corners on the first conductive layer 12, because an equipotential surface is easily formed in a generated electric field, so the sensitivity of detecting the position coordinates Px and Py is improved.

In the above-described embodiment, the case where the predetermined potential difference between the first conductive layer 12 and the second conductive layer 15 is generated by a potential difference between the AC reference signal and the DC constant potential V1 is described as an example; however, as long as the predetermined potential difference is generated, the predetermined potential difference is generated by not necessarily the potential difference between the AC reference signal and the DC constant potential V1.

The material and the thickness of each layer and the method and conditions of forming each layer are not limited to those described in the embodiment, and each layer may be made of any other material with any thickness by any other forming method under any other forming conditions. For example, in the above-described embodiment, the case where the capacity detecting portion 1 is made of a transparent or semi-transparent material is described as an example; however, the capacity detecting portion 1 is not necessarily made of a transparent or semi-transparent material, and may be made of an opaque material according to the application of the position coordinate input apparatus.

In the above-described embodiment, the structures of the coordinate input apparatus and the capacity detecting portion 1 are described in detail; however, all components or all layers are not necessarily included, or any other component or any other layer may be further included.

Figure 11:
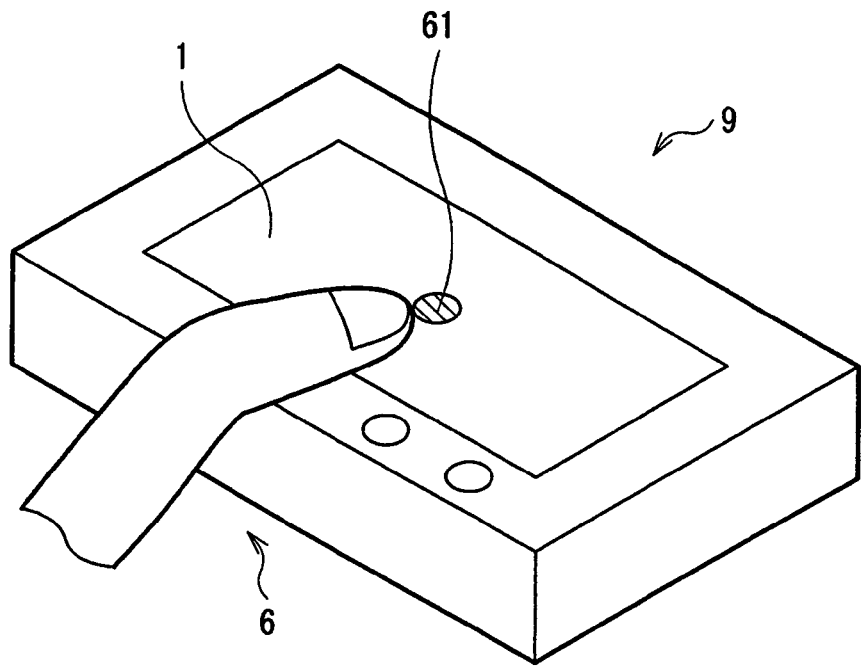
FIG. 11 is a schematic view of an example of the structure of a display unit using the coordinate input apparatus according to the embodiment of the invention.
Figure 12:
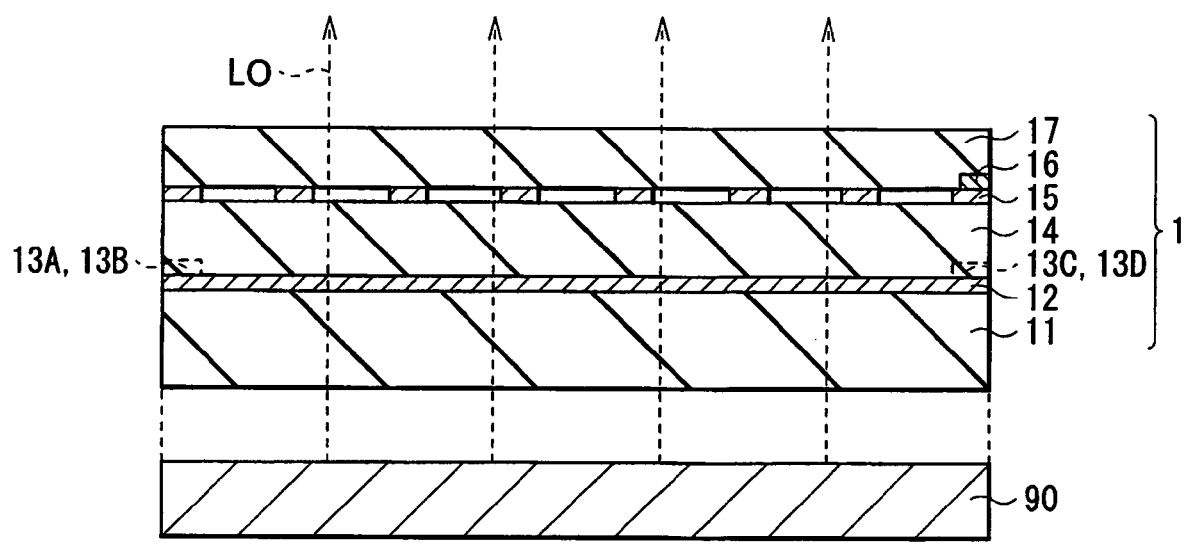
FIG. 12 is a sectional view of an example of the structure of the display unit using the coordinate input apparatus according to the embodiment of the invention.

The coordinate input apparatus according to the embodiment of the invention can be applied to, for example, a display unit 9 shown in FIG. 11. More specifically, as shown in FIG. 12, while the capacity detecting portion 1 (or the capacity detecting portion 7, 8A, 8B or the like) according to the embodiment of the invention is made of a transparent material or the like, the capacity detecting portion 1 may be formed so as to be arranged on a display panel 90 made of, for example, an organic or inorganic EL (ElectroLuminescence) display, a LCD (Liquid Crystal Display) or the like. The display unit 9 with such a structure can display an image by output light LO from the display panel 90, and as shown in FIG. 11, the display unit 9 can display the position coordinates of the contact surface 61 which is formed when the touch object 6 comes into contact with the capacity detecting portion 1. In particular, even though the display unit 9 is of a portable type, irrespective of use conditions and so on, the position coordinates can be specified and inputted.

It should be understood by those skilled in the art that various modifications, combinations, sub-combinations and alterations may occur depending on design requirements and other factors insofar as they are within the scope of the appended claims or the equivalents thereof.

What is claimed is:

1. A coordinate input apparatus, comprising:
a capacitance detecting portion which detects capacitance, wherein the coordinate input apparatus specifies a coordinate component of a selected position based on a change in capacitance detected by the capacitance detecting portion,
wherein the capacitance detecting portion comprises:
a first conductive layer,
an insulating layer uniformly formed on and contacting the first conductive layer, the insulating layer having a substantially constant thickness and being free of openings, and
a second conductive layer formed on the insulating layer and contacting the insulating layer, wherein one of the first conductive layer and the second conductive layer is a patterned sheet formed in a mesh shape and the other of the first conductive layer and the second conductive layer is a single continuous unpatterned sheet free of openings, wherein sizes of through holes in the mesh shape of the patterned sheet gradually increase from an end portion to a central portion of the patterned sheet and a predetermined potential difference exists between the second conductive layer and the first conductive layer.

2. The coordinate input apparatus according to claim 1, wherein:
the capacitance detecting portion further includes four electrodes which are formed at four corners on the first conductive layer, and
the predetermined potential difference is generated by a voltage applied via the four electrodes.

3. The coordinate input apparatus according to claim 1, wherein:
the insulating layer further serves as a substrate of the capacitance detecting portion, and
the first conductive layer is formed on one side of the substrate, and the second conductive layer is formed on another side of the substrate.

4. The coordinate input apparatus according to claim 1, wherein
holes in the mesh shape of the second conductive layer are uniformly disposed throughout the second conductive layer.

5. The coordinate input apparatus according to claim 1, wherein
widths of lines in the mesh shape of the second conductive layer gradually increase from an end portion to a central portion in the second conductive layer.

6. The coordinate input apparatus according to claim 1, wherein:
the capacitance detecting portion further includes a constant potential electrode that contacts either the first conductive layer or the second conductive layer.

7. The coordinate input apparatus according to claim 1, wherein the second conductive layer is patterned and the first conductive layer is the single continuous unpatterned sheet free of openings.

8. The coordinate input apparatus according to claim 1, wherein the one of the first conductive layer and the second conductive layer that is patterned comprises holes, each of the holes having only four sides.

9. The coordinate input apparatus according to claim 1, wherein the other of the first conductive layer and the second conductive layer that is the single continuous unpatterned sheet free of openings is free of vias.

10. The coordinate input apparatus according to claim 1, wherein the other of the first conductive layer and the second conductive layer that is the single continuous unpatterned sheet free of openings is uniformly formed.

11. The coordinate input apparatus according to claim 1, wherein the insulating layer is substantially free of openings.

12. The coordinate input apparatus according to claim 1, wherein the one of the first conductive layer and the second conductive layer that is patterned comprises holes, each of the holes having at least two sides that form an angle greater than 90 degrees.

13. The coordinate input apparatus according to claim 1, wherein the insulating layer contacts the first conductive layer.

14. The coordinate input apparatus according to claim 1, wherein contact between the insulating layer and the second conductive layer is such that no gaps are present between the insulating layer and the second conductive layer.

15. The coordinate input apparatus according to claim 1, wherein the thickness of the insulating layer is greater than each of the thickness of the first conductive layer and the thickness of the second conductive layer.

16. A display unit, comprising:
a display panel which displays an image;
a coordinate input means being formed on the display panel, and including a capacitance detecting portion which detects capacitance, the coordinate input means for specifying a coordinate component of a selected position based on a change in capacitance detected by the capacitance detecting portion, wherein the capacitance detecting portion comprises:

a first conductive layer, an insulating layer uniformly formed on and contacting the first conductive layer, the insulating layer having a substantially constant thickness and being free of openings, a second conductive layer formed on the insulating layer and contacting the insulating layer, wherein one of the first conductive layer and the second conductive layer is patterned and formed in a mesh shape and the other of the first conductive layer and the second conductive layer is a single continuous unpatterned sheet free of openings, and has a predetermined potential difference between the second conductive layer and the first conductive layer, and wherein sizes of through holes in the mesh shape of the patterned layer gradually increase from an end portion to a central portion of the patterned layer.

17. The display unit according to claim 16, wherein the capacitance detecting portion further comprises:

a plurality of electrodes formed at a plurality of respective corners of the first conductive layer, and a constant potential electrode that contacts either the first conductive layer or the second conductive layer, wherein a contact area of the constant potential electrode is approximately equal to a contact area of at least one of the plurality of electrodes.

18. A display unit, comprising:
a display panel which displays an image;
a coordinate input section being formed on the display panel, including a capacitance detecting portion which detects capacitance, and specifying a coordinate component of a selected position on the basis of a change in capacitance detected by the capacitance detecting portion, wherein the detecting portion comprises:

a first conductive layer, an insulating layer uniformly formed on and contacting the first conductive layer, the insulating layer having a substantially constant thickness and being free of openings, a second conductive layer formed on the insulating layer and contacting the insulating layer, wherein one of the first conductive layer and the second conductive layer is patterned and formed in a mesh shape and the other of the first conductive layer and the second conductive layer is a single continuous unpatterned sheet free of openings, and has a predetermined potential difference between the second conductive layer and the first conductive layer, and wherein sizes of through holes in the mesh shape of the patterned layer gradually increase from an end portion to a central portion of the patterned layer.

19. The display unit according to claim 18, wherein the detecting portion further comprises:

a constant potential electrode that contacts only one edge of either the first conductive layer or the second conductive layer.

* * * * *